US012469422B2

(12) United States Patent
Huang

(10) Patent No.: US 12,469,422 B2
(45) Date of Patent: Nov. 11, 2025

(54) METHOD FOR GENERATING TARGET GRAYSCALE VALUES AND DISPLAY PANEL

(71) Applicant: Shenzhen China Star Optoelectronics Semiconductor Display Technology Co., Ltd., Guangdong (CN)

(72) Inventor: Zeng Huang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 51 days.

(21) Appl. No.: 18/522,297

(22) Filed: Nov. 29, 2023

(65) Prior Publication Data

US 2024/0257690 A1 Aug. 1, 2024

(30) Foreign Application Priority Data

Jan. 31, 2023 (CN) ........................ 202310110490.X

(51) Int. Cl.
*G09G 3/20* (2006.01)

(52) U.S. Cl.
CPC ... *G09G 3/2007* (2013.01); *G09G 2320/0233* (2013.01); *G09G 2320/0673* (2013.01); *G09G 2360/16* (2013.01)

(58) Field of Classification Search
CPC ... G09G 2320/0233; G09G 2320/0673; G09G 2360/16; G09G 3/2007
See application file for complete search history.

(56) References Cited

U.S. PATENT DOCUMENTS

| | | | | |
|---|---|---|---|---|
| 11,322,077 | B1 * | 5/2022 | Chun | G09G 3/3208 |
| 2021/0407370 | A1 * | 12/2021 | Yang | G09G 3/006 |
| 2023/0082882 | A1 * | 3/2023 | Wang | G09G 3/3266 345/204 |
| 2023/0196995 | A1 * | 6/2023 | Li | G09G 3/3208 345/204 |
| 2023/0222950 | A1 * | 7/2023 | Zhang | G09G 3/20 345/691 |
| 2024/0135854 | A1 * | 4/2024 | Wen | G09G 5/10 |
| 2024/0386826 | A1 * | 11/2024 | Zhang | G09G 3/32 |

* cited by examiner

*Primary Examiner* — Kenneth Bukowski

(57) ABSTRACT

A method for generating target grayscale values, and a display panel are provided. The method for generating target grayscale values includes: obtaining multiple gamma curves corresponding to multiple refresh rates, each gamma curve defining a correlation between brightness values and grayscale values; determining a grayscale compensation value corresponding to each grayscale value at each refresh rate difference according to different brightness values corresponding to each grayscale value at different refresh rates, the refresh rate difference being a difference between two different refresh rates; and determining multiple target grayscale values according to grayscale values and corresponding grayscale compensation values, thereby improving a flickering caused by varying refresh rate.

20 Claims, 3 Drawing Sheets

METHOD FOR GENERATING TARGET GRAYSCALE VALUES AND DISPLAY PANEL

CROSS-REFERENCE TO RELATED APPLICATION

This application claims the benefit of priority of Chinese Patent Application No. 202310110490.X, filed on Jan. 31, 2023, the contents of which are all incorporated by reference as if fully set forth herein in their entirety.

TECHNICAL FIELD

The present disclosure relates to display technologies, and in particular, to a method for generating target grayscale values, and a display panel.

BACKGROUND

Variable refresh rate (VRR) technology was born with the development of gaming industry.

In cases where an output frame rate of a graphics card is lower than a refresh rate of a display, the VRR technology will forcibly extend the vertical blanking (VBlank) interval, so that the display continues displaying the last screen without any operation. Frame transfer is allowed to occur only after the graphics card finishes rendering an image, thus allowing the refresh rate of the display to dynamically match the output frame rate of the graphics card. However, the VRR technology will lead to the following issues: the v-blank intervals for different frames with different refresh rates are different and the leakage of the pixel circuits are also different s, which will lead to a large brightness difference between two adjacent frames when the refresh rates corresponding to the two frames change greatly, and a user will perceive a screen flicker. The user's use experience will be greatly affected.

Therefore, the existing display panel based on the VRR technology has the above problems to be improved urgently.

SUMMARY

Embodiments of the present disclosure are provided to solve the technical problem of flickering caused by the varying refresh rate of the existing display panel based on the VRR technology.

Embodiment of the present disclosure provide a method for generating target grayscale values, including steps of:

- obtaining multiple gamma curves corresponding to multiple refresh rates, where each gamma curve defines a correlation between brightness values and grayscale values;
- determining, according to different brightness values corresponding to each grayscale value at different refresh rates, a grayscale compensation value corresponding to each grayscale value at each refresh rate difference; where the refresh rate difference is a difference between two different refresh rates; and
- determining, according to the grayscale values and the grayscale compensation values corresponding to the grayscale values, multiple target grayscale values.

In an embodiment, the target grayscale values are positively correlated with the absolute values of the grayscale compensation values.

In an embodiment, the target grayscale values are obtained through a weighted calculation or a power calculation of the grayscale values and the grayscale compensation values.

In an embodiment, the absolute values of the grayscale compensation values are positively correlated with the absolute values of the refresh rate differences.

In an embodiment, the two refresh rates corresponding to each refresh rate difference form a refresh rate group, the refresh rates in different refresh rate groups are different, and a same refresh rate difference corresponds to at least two different refresh rate groups.

In an embodiment, each refresh rate difference includes multiple different sub-refresh rate differences, which correspond to different refresh rates;

- where the step of determining according to the different brightness values corresponding to each grayscale value at the different refresh rates the grayscale compensation value corresponding to each grayscale value at each refresh rate difference includes:
- determining, according to the different brightness values corresponding to each grayscale value at the different refresh rates, a sub-grayscale compensation value corresponding to each grayscale value at each sub-refresh rate difference of each refresh rate difference; where the sub-grayscale compensation values form the corresponding grayscale compensation value.

In an embodiment, each sub-grayscale compensation value is correlated with the two corresponding refresh rates.

In an embodiment, the step of determining according to the grayscale values and the grayscale compensation values corresponding to the grayscale values the target grayscale values includes:

- determining, according to the grayscale values and each sub-grayscale compensation value of each grayscale compensation value, sub-target grayscale values; where the sub-target grayscale values form the corresponding target grayscale value.

In an embodiment, the step of obtaining the gamma curves corresponding to the refresh rates, each gamma curve including the correlation between the brightness values and the grayscale values includes:

- obtaining the gamma curves corresponding to multiple color sub-pixels at the refresh rates respectively, where each gamma curve including the correlation between the brightness values and the grayscale values of the corresponding color sub-pixel;
- the step of determining according to the different brightness values corresponding to each grayscale value at the different refresh rates the grayscale compensation value corresponding to each grayscale value at each refresh rate difference includes:
- determining, according to the different brightness values corresponding to each grayscale value of each color sub-pixel at the different refresh rates, the grayscale compensation value corresponding to each grayscale value of each color sub-pixel at each refresh rate difference; and
- the step of determining according to the grayscale values and the grayscale compensation values corresponding to the grayscale values the target grayscale values includes:
- determining, according to the grayscale values of the corresponding color sub-pixel and the corresponding grayscale compensation values, the target grayscale values of the corresponding color sub-pixel.

Embodiment of the present disclosure further provide a display panel, including a memory configured to store the target grayscale values as described above.

In an embodiment, the display panel further includes:

a controller, configured to compensate the luminous brightness of the sub-pixels in the display panel with the target grayscale values as described above.

The present disclosure provides a method for generating target grayscale values and a display panel. The method for generating target grayscale values may obtain multiple gamma curves corresponding to multiple refresh rates, where each gamma curve defines a correlation between the brightness values and the grayscale values; may determine a grayscale compensation value corresponding to each grayscale value at each refresh rate difference according to the different brightness values corresponding to each grayscale value at the different refresh rates, where the refresh rate difference is a difference between two different refresh rates, and may determine multiple target grayscale values according to the grayscale values and the corresponding grayscale compensation values, so that when the refresh rate varies, it is possible to perform the brightness compensation with the corresponding target grayscale value to improve the flickering.

BRIEF DESCRIPTION OF THE DRAWINGS

The present disclosure will be further explained with the accompanying drawings. It should be noted that the drawings in the following description are only used to explain some of the embodiments of the present disclosure. For those skilled in the art, other drawings may be obtained according to these drawings without creative work.

DETAILED DESCRIPTION

Technical solutions in embodiments of the present disclosure will be clearly and completely described below with reference to the accompanying drawings. Apparently, the described embodiments are merely some of the embodiments of the present disclosure, not all of the embodiments of the present disclosure. Based on the described embodiments in the present disclosure, all other embodiments obtained by those skilled in the art without making creative efforts belong to the scope of protection of the present disclosure.

The terms “include” and “have” in the present disclosure and any variations thereof are intended to cover non-exclusive inclusion. For example, a process, method, system, product or equipment including a series of steps or modules are not limited to the listed steps or modules, but may alternatively include steps or modules not listed, or may alternatively include other steps or modules inherent to this process, method, product or equipment.

Reference to “embodiment” herein means that a particular feature, structure or characteristic described in conjunction with the embodiment can be included in at least one of the embodiments of the present disclosure. The appearance of this phrase in various positions in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

The embodiments of the present disclosure provide a method for generating target grayscale values, a device for generating target grayscale values and a display panel. The following will provide detailed explanations.

Some embodiments of the present disclosure provide a method for generating target grayscale values. The following will provide a detailed explanation on each step of the method for generating target grayscale values in the embodiments of the present disclosure.

Figure 1:
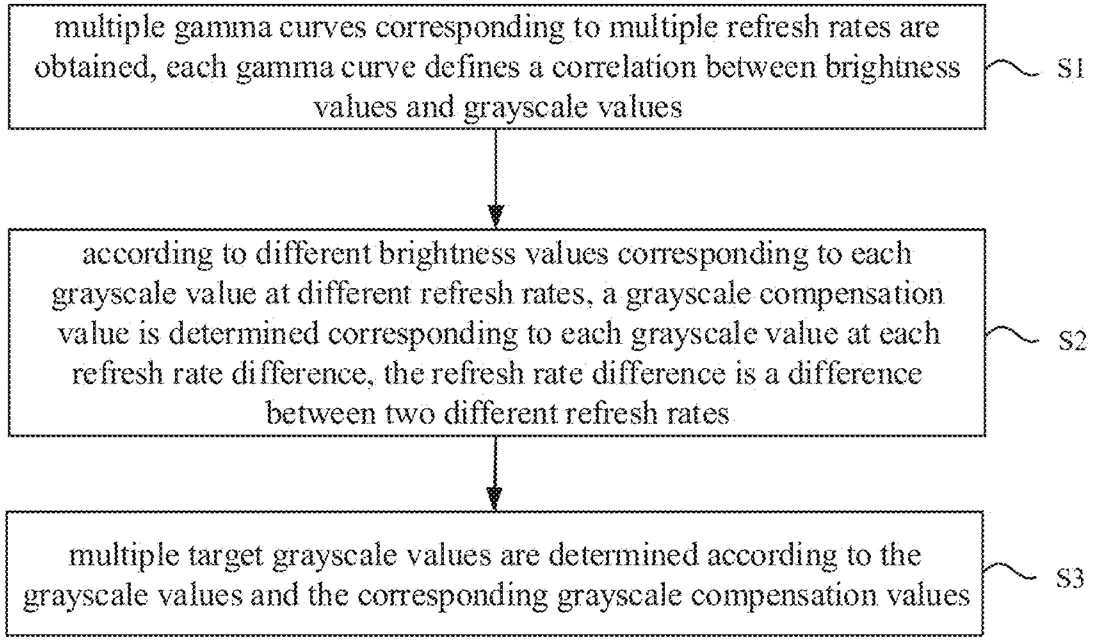
FIG. 1 illustrates a flowchart of a first method for generating target grayscale values provided by some embodiments of the present disclosure.

In an embodiment, as shown in FIG. 1, the method for generating target grayscale values may include but is not limited to the following steps.

At step S1, multiple gamma curves corresponding to multiple refresh rates are obtained, where each gamma curve defines a correlation between brightness values and grayscale values.

Figure 2:
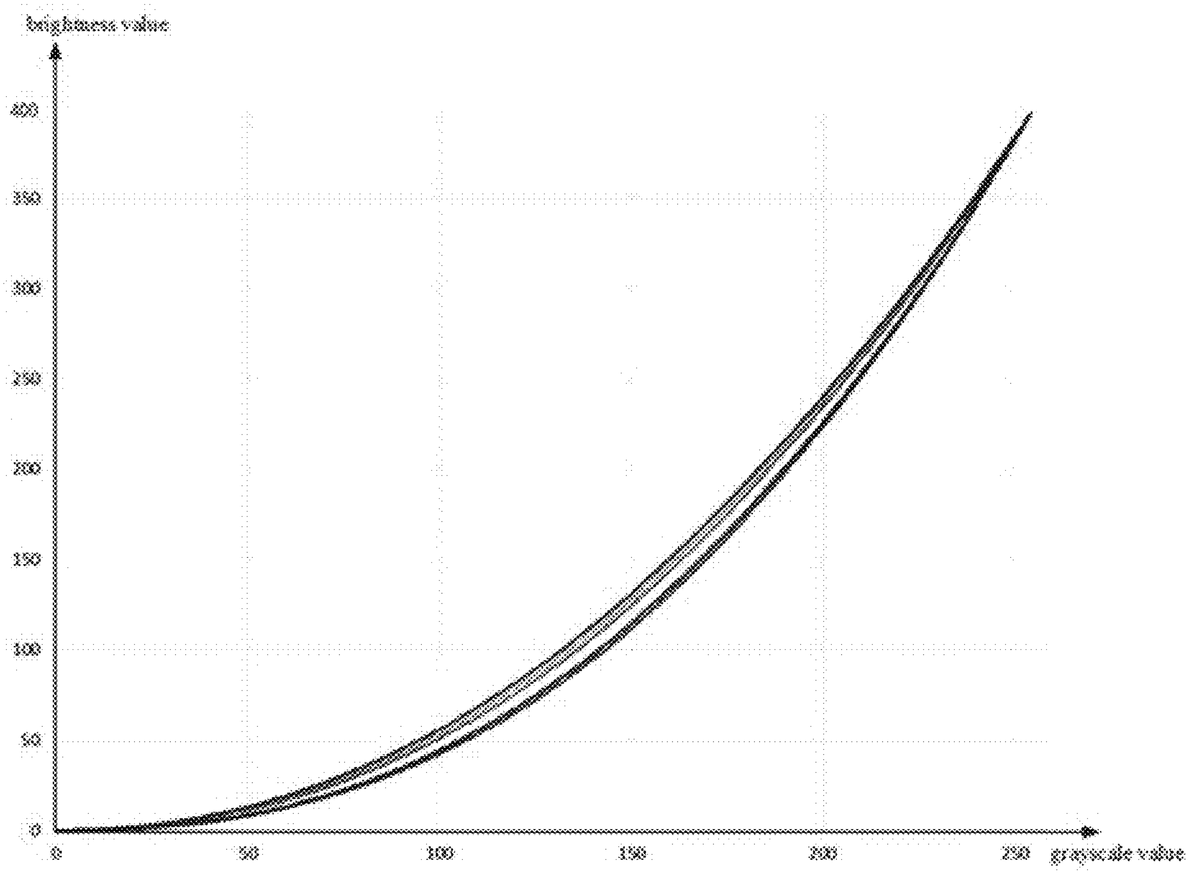
FIG. 2 illustrates a schematic view of multiple gamma curves corresponding to multiple refresh rates provided by some embodiments of the present disclosure.

Specifically, as shown in FIG. 2, for each color sub-pixel in a display panel, there may be a corresponding gamma curve at each refresh rate. As discussed above, the gamma curve may include a correlation between brightness values and grayscale values. For example, the x-axis of the gamma curves in FIG. 2 may be the grayscale value, and the y-axis of the gamma curves in FIG. 2 may be the brightness value.

It is understandable that, the color sub-pixel may emit light under an operation of an electrical signal (which may be but not limited to a data voltage) corresponding to each grayscale value, and a corresponding brightness value may be measured by an optical instrument, and thereby, each grayscale value may correspond to one brightness value such that a correspond point in the two-dimensional coordinate system shown in FIG. 2 is determined. Furthermore, multiple discrete points are determined based on the measured brightness values corresponding to the grayscale values, and a corresponding gamma curve may be obtained through fitting. Similarly, for different refresh rates, it is possible to obtain corresponding gamma curves by referring to the above processing.

In this case, the values of the multiple refresh rates corresponding to the multiple gamma curves are not limited. Only five gamma curves corresponding to the refresh rates of 144 Hz, 120 Hz, 80 Hz, 60 Hz and 48 Hz are shown in FIG. 2.

At step S2, according to different brightness values corresponding to each grayscale value at different refresh rates, a grayscale compensation value is determined corresponding to each grayscale value at each refresh rate difference, where the refresh rate difference is a difference between two different refresh rates.

Due to the differences between the refresh rates, differences also occur between the corresponding gamma curves, that is, for a same grayscale value at different refresh rates (i.e., for a same horizontal coordinate of different gamma curves in FIG. 2), the corresponding brightness values are different (i.e., the corresponding longitudinal coordinates in FIG. 2 are different), and the values of the refresh rates in FIG. 2 may be set according to the requirements of this method. In this case, if one gamma curve at a refresh rate (reference refresh rate) is taken as the reference gamma curve, a corresponding refresh rate difference may be obtained for each of the other refresh rates by subtracting from it the reference refresh rate. Thereby, at each of the other refresh rates, a corresponding brightness difference may occur between the brightness value corresponding to each of the grayscale values and the brightness value corresponding to the reference gamma curve.

Furthermore, in the embodiment, based on the "brightness difference", a corresponding operation may be performed on the basis of the corresponding grayscale value by combining the grayscale compensation value, so that the corresponding brightness value at this time may be equal to the corresponding brightness value on the reference gamma curve. As discussed above, the "grayscale compensation value" herein may be understood as the brightness provided for compensation that of the grayscale value that has the corresponding "refresh rate difference" with the reference refresh rate.

It should be noted that in the embodiment, it is not limited that the method needs to base on the reference refresh rate. Because a corresponding difference would occur between any two different refresh rates, any two different refresh rates would correspond to a unique refresh rate difference. But, each refresh rate difference may correspond to multiple different groups of two different refresh rates. Therefore, it may be considered that in the embodiment, for each grayscale value, at least one group of two different refresh rates corresponding to one same refresh rate difference may have one corresponding grayscale compensation value.

At step S3, multiple target grayscale values are determined according to the grayscale values and the corresponding grayscale compensation values.

As discussed above, based on the "brightness difference", the corresponding operation may be performed on the basis of the corresponding grayscale value by combining the grayscale compensation value, so that the corresponding brightness value at this time may be equal to the corresponding brightness value on the reference gamma curve. And the value obtained by "performing the corresponding operation on the basis of the corresponding grayscale value by combining the grayscale compensation value" may be understood as the "target grayscale value" herein.

It can be understood that, in combination with the above discussion, by using the determined target grayscale value corresponding to each grayscale value in the embodiment, it is possible to make the brightness value of a color sub-pixel close to or equal to the brightness value on the gamma curve corresponding to the refresh rate difference by applying the electric signal corresponding to the target grayscale value on the corresponding color sub-pixel in a later stage based on the corresponding refresh rate difference.

In an embodiment, the target grayscale value is positively correlated with the absolute value of the grayscale compensation value. Specifically, in combination with the above discussion, the absolute value of the grayscale compensation value may be set according to the definition of the "grayscale compensation value". For example, the "grayscale compensation value" may be considered as a difference between two grayscale values corresponding to two brightness values corresponding to the "brightness difference" on one same gamma curve, that is, the absolute value of the "grayscale compensation value" is positively correlated with the absolute value of the "brightness difference". That is, it may be considered that the greater the absolute value of the above "brightness difference", the greater the absolute value of the "grayscale compensation value".

Furthermore, as discussed above, based on the "brightness difference", the corresponding operation may be performed on the basis of the corresponding grayscale value by combining the grayscale compensation value. In the embodiment, it is further defined that the absolute value of the target grayscale value is positively correlated with the absolute value of the grayscale compensation value. That is, the target grayscale value may be obtained by performing a corresponding forward operation on the basis of the corresponding grayscale value by combining the absolute value of the grayscale compensation value, that is, the target grayscale value is positively correlated with the absolute value of the "brightness difference".

In an embodiment, the target grayscale value is obtained by performing a weighted calculation or a power calculation of the corresponding grayscale value and the corresponding grayscale compensation value. As discussed above, the target grayscale value may be obtained by performing the corresponding forward operation on the basis of the corresponding grayscale value by combining the absolute value of the grayscale compensation value, and the target grayscale value is positively correlated with the absolute value of the grayscale compensation value. It should be noted that the grayscale value is the basis for obtaining the target grayscale value, and the target grayscale value is also positively correlated with the corresponding grayscale value.

Specifically, when performing a weighted calculation of the corresponding grayscale value and the corresponding grayscale compensation value to obtain the target grayscale value, the adopted formula may be, but is not limited to:

$$\mathrm{gray} = \mathrm{gray0} * k1 * (fps0 - fps') + \mathrm{gray0} * k2.$$

Where gray0 is a grayscale value of a current frame, that is, the grayscale value discussed above; fps0 is a GPU (graphics processing unit) render (GPU) for the current frame, that is, the above "refresh rate" of the current frame; fps' is a GPU render rate for a last frame, that is, the above "refresh rate" of the last frame, and (fps0–fps') may be understood as the above refresh rate difference; k1 and k2 are two coefficient values respectively, and the specific values of k1 and k2 may be determined according to the above gamma curves. It can be understood that, as discussed above, the sign (positive or negative) of k1 may be correlated with the sign (positive or negative) of (fps0–fps'), as long as it is assured that k1*b (fps0–fps')=k3*|fps0–fps'| and k3 is a positive number. And the sign (positive or negative) of k2 may be correlated with the value of k1*(fps0–fps'), as long as it is realized that [k2+k1*(fps0–fps')] is a positive number.

Specifically, when performing a power calculation of the corresponding grayscale value and the corresponding grayscale compensation value to obtain the target grayscale value, the adopted formula may be, but is not limited to:

$$\mathrm{gray} = n2 * [\mathrm{gray0} * |fps0 - fps'|]^{n1} + n3;$$

$$\mathrm{gray} = n4 * \mathrm{gray0}^{|fps0 - fps'|} + n5; \text{ or}$$

$$\mathrm{gray} = n6 * |fps0 - fps'|^{\mathrm{gray0}} + n7.$$

Where n1, n2, n3, n4, n5, n6 and n7 are multiple coefficient values respectively, and their specific values only need to meet the above discussion.

In an embodiment, the absolute value of the grayscale compensation value is positively correlated with the absolute value of the refresh rate difference. Specifically, as discussed above, the target grayscale value is positively correlated with the absolute value of the grayscale compensation value, and the absolute value of the grayscale compensation value is positively correlated with the absolute value of the "brightness difference". It can be understood that for one same grayscale value, the difference between the refresh rates will cause the difference between the brightness values, and the greater the difference between the refresh rates (the absolute value of the refresh rate difference), the greater the difference between the brightness values (the absolute value of the brightness difference), and the greater the absolute value of the grayscale compensation value positively correlated with it.

In an embodiment, two refresh rates corresponding to the refresh rate difference form a refresh rate group. The refresh rates in different refresh rate groups are different, and one same refresh rate difference at least corresponds to two different refresh rate groups. Specifically, in combination with the above discussion, each refresh rate difference may correspond to multiply different groups of two refresh rates, that is, each refresh rate difference may correspond to different refresh rate groups. In the embodiment, it is further defined that one same refresh rate difference may correspond to at least two different refresh rate groups, that is, at least two different refresh rate groups may correspond to one same grayscale compensation value and one same target grayscale value.

Figure 3:
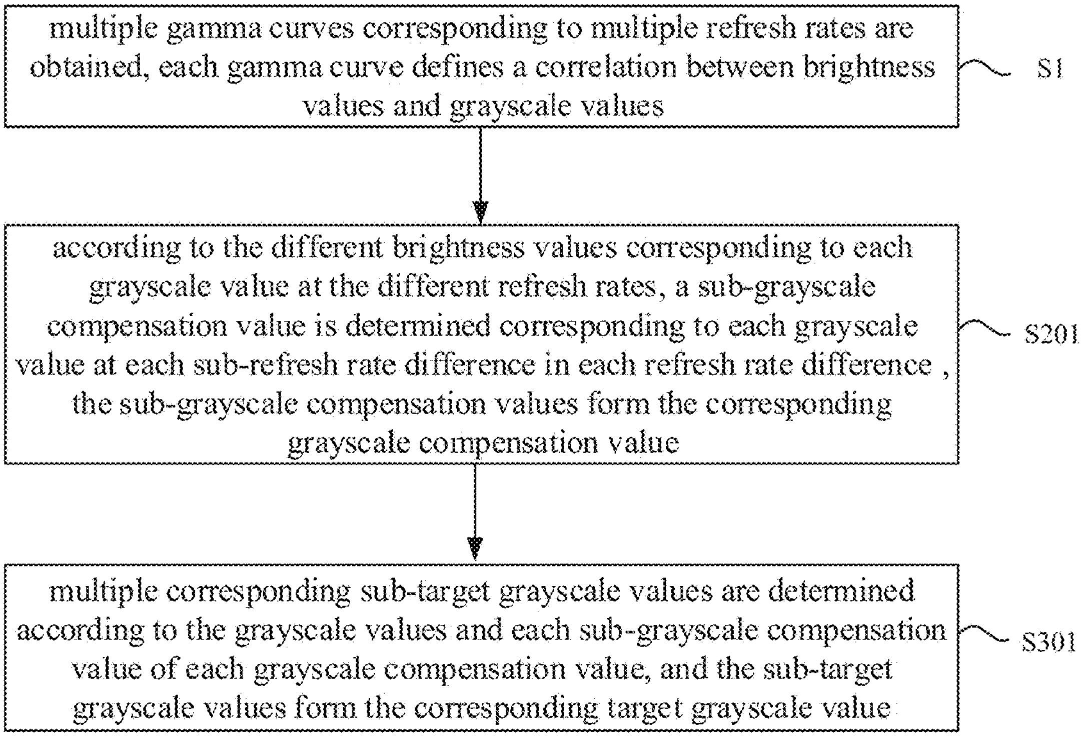
FIG. 3 illustrates a flowchart of a second method for generating target grayscale values provided by some embodiments of the present disclosure.

In an embodiment, as shown in FIG. 3, in step S2, the refresh rate difference includes multiple different sub-refresh rate differences, and the refresh rates corresponding to the different sub-refresh rate differences are different. In this case, step S2 may include, but is not limited to, the following step S201. At step S201, according to the different brightness values corresponding to each grayscale value at the different refresh rates, a sub-grayscale compensation value is determined corresponding to each grayscale value at each sub-refresh rate difference in each refresh rate difference, and the multiple sub-grayscale compensation values form the corresponding grayscale compensation value.

Specifically, in the embodiment, it is further defined that the refresh rates corresponding to different sub-refresh rate differences in the refresh rate differences are different. In combination with the above discussion, the differences among the multiple refresh rate groups corresponding to one same refresh rate difference are further considered here, and the multiple refresh rate groups with different values may be corresponded by dividing each refresh rate difference into multiple different sub-refresh rate differences. Furthermore, in step S201, the different sub-grayscale compensation values corresponding to the different sub-refresh rate differences, that is corresponding to the different refresh rate groups, are obtained through the division of sub-refresh rate differences, and thereby the compensation required by the multiply different refresh rate groups with the same absolute value of refresh rate differences but different specific refresh rates in the corresponding refresh rate groups may be set differently.

In an embodiment, the sub-grayscale compensation values are each correlated with two corresponding refresh rates. Specifically, in combination with the above discussion, the sub-grayscale compensation values correspond to the sub-refresh rate differences one to one, and the sub-refresh rate differences correspond to the refresh rate groups one to one, and specifically correspond to both refresh rates of the refresh rate groups. So it can be considered that each sub-grayscale compensation value is correlated with two corresponding refresh rates, and the value of each refresh rate in the refresh rate groups will affect the value of the sub-grayscale compensation value.

According to the above discussion about the gamma curves, for one same grayscale value at different refresh rates (i.e., for a same horizontal coordinate of different gamma curves in FIG. 2), the corresponding brightness values are different (i.e., the corresponding longitudinal coordinates in FIG. 2 are different). Furthermore, the differences of the corresponding brightness values are also different for different refresh rate groups (i.e., the differences of two sets of longitudinal coordinates on two different gamma curves in FIG. 2 are different), and therefore the respective necessary compensation (i.e., the sub-grayscale compensation values) are different.

Specifically, as shown in Table 1, each sub-grayscale compensation value may correspond to two refresh rates, one of which may be the refresh rate fps0 of the current frame and the other may be the refresh rate fps' of the last frame. For example, in cases where the refresh rate fps' of the last frame is 48 and the refresh rate fps0 of the current frame is equal to 48 and 144 respectively, the two corresponding sub-grayscale compensation values are respectively $gray_{11}$ and $gray_{1n}$. For another example, in cases where the refresh rate fps' of the last frame is 144 and the refresh rate fps0 of the current frame is equal to 48 and 144 respectively, the two corresponding sub-grayscale compensation values are respectively $gray_{m1}$ and $gray_{mn}$. It can be understood that in cases where the refresh rate fps' of the last frame is equal to the refresh rate fps0 of the current frame, the corresponding sub-grayscale compensation values may be 0, that is, the $gray_{11}$ and the $gray_{mn}$ in Table 1 may both be equal to 0.

TABLE 1

| | fps0 | | |
|---|---|---|---|
| fps' | 48 | . . . | 144 |
| 48 | $gray_{11}$ | . . . | $gray_{1n}$ |
| . . . | . . . | . . . | . . . |
| 144 | $gray_{m1}$ | . . . | $gray_{mn}$ |

In this case, for each sub-refresh rate difference, it is possible to further compensate the electrical signal corresponding to a corresponding sub-grayscale compensation value, on the basis of the electrical signal corresponding to the grayscale value at one refresh rate of two corresponding refresh rates, according to the difference between the two brightness values corresponding to each grayscale value in the two gamma curves corresponding to the two refresh rates, so that the resulted brightness value may be equal to the brightness value presented for the grayscale value at another refresh rate. Thereby, the sub-grayscale compensation value corresponding to each sub-refresh rate difference may be obtained.

Furthermore, in combination with the above discussion about Table 1, it may be considered that the issue of flicker caused by the difference between the brightness values when the refresh rate fps' of the last frame changes to the refresh rate fps0 of the current frame can be compensated by the corresponding sub-gray compensation values. As discussed above, the determination of the sub-gray compensation values is also determined by the difference between two brightness values on two corresponding gamma curves for one same grayscale value (there are positive and negative differences).

In an embodiment, as shown in FIG. 3, based on step S201, step S3 may include, but is not limited to, the following step S301. At step S301, multiple corresponding sub-target grayscale values are determined according to the multiple grayscale values and each sub-grayscale compensation value of each corresponding grayscale compensation value, and the multiple sub-target grayscale values form the corresponding target grayscale value.

Specifically, in combination with the above discussion, based on the "brightness difference" (which is positively correlated with the absolute value of the refresh rate difference), it is possible to perform the corresponding operation on the basis of the corresponding grayscale value by combining the grayscale compensation value, so that the brightness value at this time may be equal to the corresponding brightness value on the reference gamma curve. Furthermore, in cases where the grayscale compensation value includes different sub-grayscale compensation values corresponding to different refresh rate groups, similarly, it is possible to perform the corresponding operation on the basis of the corresponding grayscale value by combining the sub-grayscale compensation values to obtain the corresponding sub-target grayscale values to compensate the brightness under the grayscale value. It is understandable that, the values of the refresh rates in the refresh rate groups are different, the corresponding sub-grayscale compensation values are also different, so the calculated values of the sub-target grayscale are different as well.

For the calculation relationship between the sub-target grayscale values and the sub-grayscale compensation values, one may refer to the above calculation relationship between the target grayscale values and the grayscale compensation values.

Figure 4:
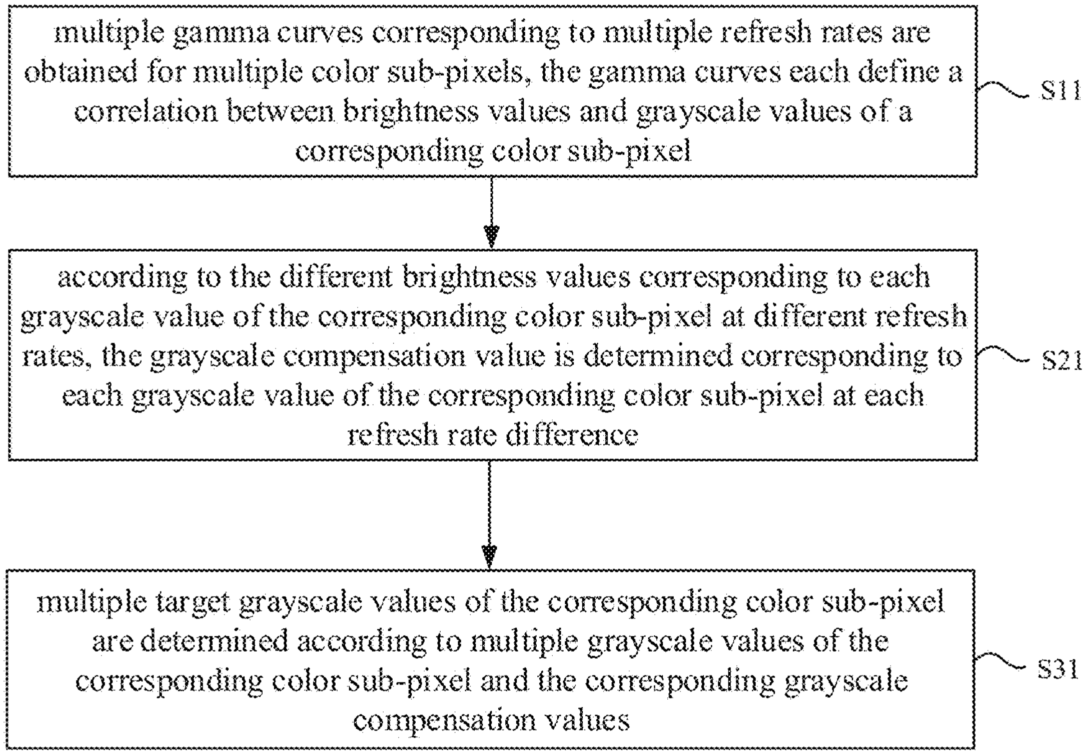
FIG. 4 illustrates a flowchart of a third method for generating target grayscale values provided by some embodiments of the present disclosure.

In an embodiment, as shown in FIG. 4, the step S1 may include, but is not limited to, the following step S11. At step S11, multiple gamma curves corresponding to multiple refresh rates are obtained for multiple color sub-pixels, the gamma curves each define a correlation between brightness values and grayscale values for a corresponding color sub-pixel. The step S2 may include, but is not limited to, the following step S21. At step S21, according to the different brightness values corresponding to each grayscale value of the corresponding color sub-pixel at different refresh rates, the grayscale compensation value is determined corresponding to each grayscale value of the corresponding color sub-pixel at each refresh rate difference. The step S3 may include, but is not limited to, the following step S31. At step S31, multiple target grayscale values of the corresponding color sub-pixel are determined according to the multiple grayscale values of the corresponding color sub-pixel and the multiple corresponding grayscale compensation values.

According to the above discussion, for each color sub-pixel in the display panel, there is a corresponding gamma curve at each refresh rate. So the embodiment has provided further details on how to obtain the multiple gamma curves corresponding to the multiple refresh rates through step S11. That is, for each color sub-pixel, a corresponding gamma curve may be obtained for each refresh rate. Furthermore, step S21 further provides that the grayscale compensation value corresponding to each grayscale value of each color sub-pixel at each refresh rate difference may also be determined from the two corresponding gamma curves. Similarly, each grayscale value of each color sub-pixel may also have a corresponding sub-grayscale compensation value at each refresh rate group of each refresh rate difference. Further, step S31 may also determine the corresponding target grayscale value based on the grayscale value of the color sub-pixel and the corresponding grayscale compensation value. Similarly, it is also possible to obtain the corresponding sub-target grayscale value by calculating the corresponding sub-grayscale compensation value corresponding to each grayscale value of each color sub-pixel at each refresh rate group of each refresh rate difference.

Some embodiments of the present disclosure further provide a device for generating target grayscale values, which is used for executing any of the above methods for generating the target grayscale values Some embodiments of the present disclosure further provide a display panel, which includes a memory configured to store the target grayscale values as described above. Furthermore, the display panel further includes a controller, configured to compensate the luminous brightness of the sub-pixels in the display panel with the target grayscale values as described above.

The present disclosure provides the method for generating target grayscale values, the device for generating target grayscale values and the display panel. The method for generating target grayscale values obtains multiple gamma curves corresponding to multiple refresh rates, where each gamma curve includes a correlation between brightness values and grayscale values; determines the grayscale compensation value for each grayscale value at each refresh rate difference according to the different brightness values corresponding to each grayscale value at different refresh rates, where the refresh rate difference is the difference between two different refresh rates; and determines multiple target grayscale values according to the grayscale values and the corresponding grayscale compensation values, so as to perform corresponding brightness compensation with the corresponding target grayscale value in cases where the refresh rate varies, to improve the flickering.

The method for generating the target grayscale values, the device for generating the target grayscale values and the display panel provided by the embodiments of the present disclosure are described in detail above, and each functional module can be integrated in one processing chip, or each module can exist physically alone, or two or more modules can be integrated in one module. The above integrated modules can be realized in the form of hardware or software functional modules. In this paper, specific examples are used to explain the principle and implementation of the present disclosure, and the description of the above embodiments is only used to help understand the method and its core idea of the present disclosure; and for those skilled in the art, according to the idea of the present disclosure, there will be some changes in the specific implementation and application scope. To sum up, the contents of the specification should not be understood as limiting the present disclosure.

What is claimed is:

1. A method for generating target grayscale values, comprising steps of:

obtaining a plurality of gamma curves corresponding to a plurality of refresh rates, each of the plurality of gamma curves defining by a correlation between brightness values and grayscale values;

determining, according to different brightness values corresponding to each grayscale value at different refresh rates, a grayscale compensation value corresponding to each grayscale value at each refresh rate difference; wherein the refresh rate difference is a difference between two different refresh rates; and determining, through performing a forward operation based on each grayscale value combined with an absolute value of a corresponding grayscale compensation value, a plurality of target grayscale values.

2. The method for generating target grayscale values according to claim 1, wherein the target grayscale values are positively correlated with absolute values of the grayscale compensation values.

3. The method for generating target grayscale values according to claim 2, wherein the plurality of target grayscale values are obtained through a weighted calculation or a power calculation of the grayscale values and the grayscale compensation values.

4. The method for generating target grayscale values according to claim 1, wherein absolute values of the grayscale compensation values are positively correlated with absolute values of the refresh rate differences.

5. The method for generating target grayscale values according to claim 1, wherein two refresh rates corresponding to each refresh rate difference form a refresh rate group, refresh rates in different refresh rate groups are different, and a same refresh rate difference corresponds to at least two different refresh rate groups.

6. The method for generating target grayscale values according to claim 5, wherein each refresh rate difference comprises a plurality of different sub-refresh rate differences, which correspond to different refresh rates;

wherein the step of determining according to the different brightness values corresponding to each grayscale value at the different refresh rate the grayscale compensation value corresponding to each grayscale value at each refresh rate differences comprises:

determining, according to the different brightness values corresponding to each grayscale value at the different refresh rates, a sub-grayscale compensation value corresponding to each grayscale value at each sub-refresh rate difference of each refresh rate difference; wherein a plurality of sub-grayscale compensation values form the corresponding grayscale compensation value.

7. The method for generating target grayscale values according to claim 6, wherein each sub-grayscale compensation value is correlated with the two corresponding refresh rates.

8. The method for generating target grayscale values according to claim 6, wherein the step of determining according to the grayscale values and the grayscale compensation values corresponding to the grayscale values the plurality of target grayscale values comprises:

determining, according to the grayscale values and each sub-grayscale compensation value of each grayscale compensation value, a plurality of sub-target grayscale values; wherein the plurality of sub-target grayscale values form the corresponding target grayscale values.

9. The method for generating target grayscale values according to claim 1, wherein the step of obtaining the plurality of gamma curves corresponding to the plurality of refresh rates, each of the plurality of gamma curves comprising the correlation between the brightness values and the grayscale values, comprises:

obtaining the plurality of gamma curves corresponding to a plurality of color sub-pixels at the plurality of refresh rates respectively; wherein each of the plurality of gamma curve comprises the correlation between the brightness values and the grayscale values of the corresponding color sub-pixel;

wherein the step of determining according to the different brightness values corresponding to each grayscale value at the different refresh rate the grayscale compensation value corresponding to each grayscale value at each refresh rate difference comprises:

determining, according to the different brightness values corresponding to each grayscale value of each color sub-pixel at the different refresh rates, the grayscale compensation value corresponding to each grayscale value of each color sub-pixel at each refresh rate difference; and wherein the step of determining according to the grayscale values and the grayscale compensation values corresponding to the grayscale values, the plurality of target grayscale values comprises:

determining, according to the grayscale values of the corresponding color sub-pixel and the corresponding grayscale compensation values, the plurality of target grayscale values of the corresponding color sub-pixel.

10. A non-transitory computer readable storage medium having stored thereon executable instructions, the instructions when executed by one or more processors causing the one or more processors to perform operations comprising:

obtaining a plurality of gamma curves corresponding to a plurality of refresh rates, each of the plurality of gamma curves defining by a correlation between brightness values and grayscale values;

determining, according to different brightness values corresponding to each grayscale value at different refresh rates, a grayscale compensation value corresponding to each grayscale value at each refresh rate difference; wherein the refresh rate difference is a difference between two different refresh rates; and determining, through performing a forward operation based on each grayscale value combined with an absolute value of a corresponding grayscale compensation value, a plurality of target grayscale values.

11. The non-transitory computer readable storage medium according to claim 10, wherein the target grayscale values are positively correlated with absolute values of the grayscale compensation values.

12. The non-transitory computer readable storage medium according to claim 11, wherein the plurality of target grayscale values are obtained through a weighted calculation or a power calculation of the grayscale values and the grayscale compensation values.

13. The non-transitory computer readable storage medium according to claim 12, wherein the instructions when executed by the one or more processors cause the one or more processors to further perform operations comprising:

compensating luminous brightness of sub-pixels in the display panel with the plurality of target grayscale values.

14. The non-transitory computer readable storage medium according to claim 10, wherein absolute values of the grayscale compensation values are positively correlated with absolute values of the refresh rate differences.

15. The non-transitory computer readable storage medium according to claim 14, wherein the instructions when executed by the one or more processors cause the one or more processors to further perform operations comprising:

compensating luminous brightness of sub-pixels in the display panel with the plurality of target grayscale values.

16. The non-transitory computer readable storage medium according to claim 10, wherein two refresh rates corresponding to each refresh rate difference form a refresh rate group, refresh rates in different refresh rate groups are different, and a same refresh rate difference corresponds to at least two different refresh rate groups.

17. The non-transitory computer readable storage medium according to claim 16, wherein the instructions when executed by the one or more processors cause the one or more processors to further perform operations comprising:

compensating luminous brightness of sub-pixels in the display panel with the plurality of target grayscale values.

18. The non-transitory computer readable storage medium according to claim 16, wherein the step of obtaining the plurality of gamma curves corresponding to the plurality of refresh rates, each of the plurality of gamma curves comprising the correlation between the brightness values and the grayscale values, comprises:

obtaining the plurality of gamma curves corresponding to a plurality of color sub-pixels at the plurality of refresh rates respectively; wherein each of the plurality of gamma curve comprises the correlation between the brightness values and the grayscale values of the corresponding color sub-pixel;

wherein the step of determining according to the different brightness values corresponding to each grayscale value at the different refresh rate the grayscale compensation value corresponding to each grayscale value at each refresh rate difference comprises:

determining, according to the different brightness values corresponding to each grayscale value of each color sub-pixel at the different refresh rates, the grayscale compensation value corresponding to each grayscale value of each color sub-pixel at each refresh rate difference; and wherein the step of determining according to the grayscale values and the grayscale compensation values corresponding to the grayscale values, the plurality of target grayscale values comprises:

determining, according to the grayscale values of the corresponding color sub-pixel and the corresponding grayscale compensation values, the plurality of target grayscale values of the corresponding color sub-pixel.

19. The non-transitory computer readable storage medium according to claim 10, wherein the instructions when executed by the one or more processors cause the one or more processors to further perform operations comprising:

compensating luminous brightness of sub-pixels in the display panel with the plurality of target grayscale values.

20. The non-transitory computer readable storage medium according to claim 11, wherein the instructions when executed by the one or more processors cause the one or more processors to further perform operations comprising:

compensating luminous brightness of sub-pixels in the display panel with the plurality of target grayscale values.

* * * * *